E. A. LELAND.
PIPE-COUPLINGS.

No. 187,394.

Patented Feb. 13, 1877.

Witnesses:
Henry Eichling
H. Wells Jr.

Inventor:
Edwin A. Leland
per James A. Whitney
Att.

UNITED STATES PATENT OFFICE.

EDWIN A. LELAND, OF BROOKLYN, NEW YORK.

IMPROVEMENT IN PIPE-COUPLINGS.

Specification forming part of Letters Patent No. 187,394, dated February 13, 1877; application filed October 17, 1876.

*To all whom it may concern:*

Be it known that I, EDWIN A. LELAND, formerly of New York city, but now residing in Brooklyn, in the county of Kings and State of New York, have invented certain Improvements in Pipe-Couplings, of which the following is a specification:

In the fitting of the pipes and tubings upon locomotives and in many other arts, it is necessary to fit a piece or section of the pipe or tube within a given length or space, the longitudinal movement of the inserted pipe or section being necessarily prevented by the rigidity of the parts to which it is to be affixed or joined.

The object of this invention is to provide a means whereby such section of pipes or tubes may be fitted into place without dislocating the pipes or tubes to which they may be attached, and with very great ease and convenience of manipulation.

To this end the invention comprises a peculiar construction of what may be termed a ball-joint, the end of the section to be fitted into place being turned or swung to its place laterally, without the necessity of longitudinal movement.

The invention comprises a novel combination of a main nut constructed with a concave socket, an internal tapering thimble, constructed with a hemispherical or semi-spheroidal bearing-face and a tapering holding-nut; these several parts being combined in such relation with each other and with the flared end of the pipe or tube section that the holding-nut, being first slipped upon the pipe or tube section, the latter with its thimble may be swung with the face of the thimble fitted into the socket of the main nut, and the holding-nut then screwed home to bind the parts firmly together with a tight and snug joint.

Figure 1:
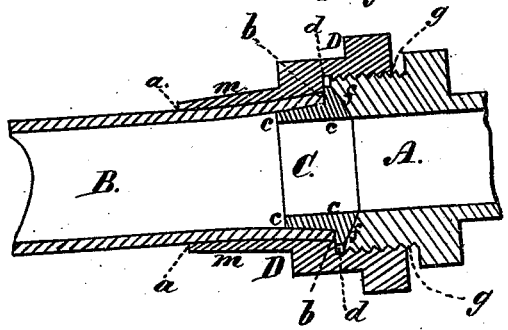
Figure 2:
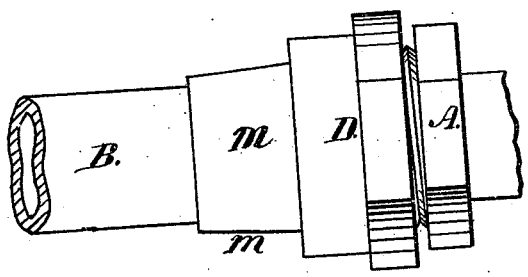
Figure 3:
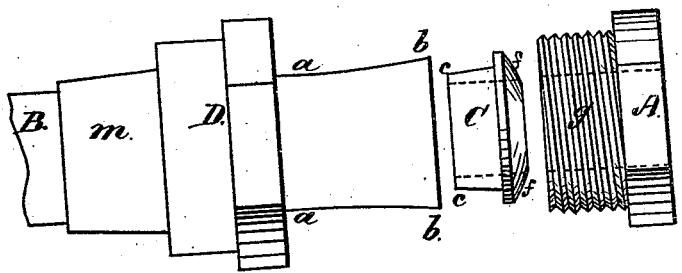

Figure 1 is a longitudinal sectional view of a coupling made according to my invention. Fig. 2 is a side view of the same. Fig. 3 is a side view of the several parts comprised in said coupling detached from each other.

A is the main nut provided upon the end of the pipe, tube, or fixture to which the pipe or tube section is to be attached. The said pipe or tube section is shown at B, and in practice is commonly and preferably made of copper, although it may be of any other suitable metal or material. The end of this pipe or tube section B is enlarged to tapering or flaring form, as shown from *a* to *b*. C is an internal thimble, the principal portion *c* of which is externally of a form tapered to correspond to the internal taper of the part *a b* of the pipe or tube section B. At the outermost end portion of the thimble C is a circumferential flange, *d*, flat at its innermost side, but on its outer side or face made sloping outward and toward the axis of the thimble upon an outward curve, as represented at *f*, thereby giving to the outer face of the thimble C a partially-spherical or semi-spheroidal contour, as more fully indicated in Figs. 1 and 3. The adjacent end of the main nut A is recessed concentric with the bore of said nut, forming a concave socket corresponding in shape with the face *f* of the thimble C, and into which when the parts are put together in forming the joint; said face *f* of the thimble C is fitted, as represented in Fig. 1, this thimble C having its tapering main portion *c* fitted into the flared end of the pipe or tube section B, with the end of the latter bearing against the flat inner surface of the flange *d*. D is the holding-nut, constructed to screw upon the main nut A, as represented at *g*, and constructed with a tapering neck or collar, *m*, which fits upon the flared external surface of the end of the pipe or tube section B, as more fully shown in Fig. 1.

In the practical application of the invention the holding-nut D is slipped upon the pipe or tube section B, and the end of the latter is then brought to the requisite taper or flaring form by the use of a suitable tool. This done, the thimble C is inserted in the said end of the pipe or tube section B, as hereinbefore explained, and the said section is then swung laterally in such fashion as to bring the convex face *f* of the thimble C into the concave socket provided in the adjacent end of the main nut A, whereupon the holding-nut D is screwed upon the said main nut A. The tapering collar *m* of the nut D drawing and holding upon the enlarged or flaring end of the pipe or tube section B, crowds the same firmly upon the tapering portion *c* of the thimble C, with the end of said section pressed against the flat inner side of the flange $d$ of the aforesaid thimble C, this at the same time binding the convex face $f$ of the thimble C snugly and firmly into the socket in the adjacent end of the main nut A, there being by this means provided a firm, close, and tight joint between the pipe or tube section B and the main nut A, without the necessity of displacing the nut A from the fixed position which ordinarily it necessarily occupies during the attachment of the pipe or tube section B thereto.

What I claim as my invention is—

The pipe-coupling, comprising the main nut A, having the concave socket provided in its end, the tapering thimble C, constructed with the convex face $f$, the holding-nut D, constructed with the collar $m$, and the pipe or tube section B, having its end flared or enlarged, the whole constructed, combined, and arranged substantially as and for the purpose herein set forth.

EDWIN A. LELAND.

Witnesses:
EDWARD HOLLY,
H. WELLS, Jr.